(12) United States Patent
Burnett

(10) Patent No.: US 9,815,005 B2
(45) Date of Patent: Nov. 14, 2017

(54) APPARATUS AND METHOD FOR SEPARATING SOLIDS FROM A SOLIDS LADEN DRILLING FLUID

(75) Inventor: George Alexander Burnett, Aberdeen (GB)

(73) Assignee: National Oilwell Varco, L.P., Houston, TX (US)

( * ) Notice: Subject to any disclaimer, the term of this patent is extended or adjusted under 35 U.S.C. 154(b) by 619 days.

(21) Appl. No.: 13/643,968

(22) PCT Filed: Mar. 24, 2011

(86) PCT No.: PCT/GB2011/050599
§ 371 (c)(1),
(2), (4) Date: Jan. 6, 2013

(87) PCT Pub. No.: WO2011/135320
PCT Pub. Date: Nov. 3, 2011

(65) Prior Publication Data
US 2013/0105412 A1    May 2, 2013

(30) Foreign Application Priority Data
Apr. 29, 2010 (GB) .................................. 1007165.2

(51) Int. Cl.
*B07B 1/46* (2006.01)
*B01D 33/03* (2006.01)
(Continued)

(52) U.S. Cl.
CPC ............ *B01D 33/0376* (2013.01); *B07B 1/46* (2013.01); *B07B 2201/02* (2013.01); *B07B 2201/04* (2013.01)

(58) Field of Classification Search
CPC ................................................ B07B 2201/02
See application file for complete search history.

(56) References Cited

U.S. PATENT DOCUMENTS 2,285,348 A   6/1942   Hubbard
4,288,320 A   9/1981   Wilson
(Continued)

FOREIGN PATENT DOCUMENTS

GB   1526663 A   9/1978
GB   1578948 A   11/1980
(Continued)

OTHER PUBLICATIONS

Jun. 15, 2010 Search Report from corresponding application GB1007165.2, 3 pages.
(Continued)

*Primary Examiner* — David C Mellon
*Assistant Examiner* — Bradley R Spies
(74) *Attorney, Agent, or Firm* — Conley Rose, P.C.

(57) ABSTRACT

An apparatus for separating solids from solids laden drilling fluid is provided. The apparatus includes a shale shaker and a screen assembly. The shale shaker includes a base and a basket isolated from the base, a flow tray arranged in the basket for directing screened drilling fluid. The screen assembly includes at least one layer of screening material, a screen support having a perimeter with at least one support point within the perimeter, wherein the flow tray includes at least one raised portion to support the screen assembly. In some versions the shale shaker has a basket having side supports and at least one intermediate support arranged between the side supports. The screen assembly includes a screen support supporting at least one layer of screening material.

19 Claims, 10 Drawing Sheets

(51) Int. Cl.
*B07B 1/49* (2006.01)
*B07B 1/42* (2006.01)

(56) References Cited

U.S. PATENT DOCUMENTS

| | | | |
|---|---|---|---|
| 4,923,597 | A | 5/1990 | Anderson et al. |
| 5,203,460 | A | 4/1993 | Deister et al. |
| 5,265,730 | A | 11/1993 | Norris et al. |
| 5,690,826 | A | 11/1997 | Cravello |
| 6,302,276 | B1 | 10/2001 | Seyffert et al. |
| 6,454,099 | B1 | 9/2002 | Adams et al. |
| 6,672,459 | B1 | 1/2004 | Nogalski |
| 2005/0274652 | A1 | 12/2005 | Laveine et al. |
| 2007/0187303 | A1 | 8/2007 | Fisher et al. |
| 2007/0227954 | A1* | 10/2007 | Nogalski ............. 209/404 |
| 2008/0105598 | A1 | 5/2008 | Fisher et al. |
| 2008/0251428 | A1* | 10/2008 | Bailey ............. 209/269 |
| 2009/0206011 | A1* | 8/2009 | Cudahy ............. 209/365.3 |
| 2010/0089652 | A1 | 4/2010 | Burnett |

FOREIGN PATENT DOCUMENTS

| | | |
|---|---|---|
| GB | 2176424 A | 12/1986 |
| GB | 2206501 A | 1/1989 |
| GB | 2425743 A | 11/2006 |
| WO | 96/33792 A1 | 10/1996 |
| WO | 98/16328 A1 | 4/1998 |
| WO | 0176720 A1 | 10/2001 |
| WO | 03013690 A1 | 2/2003 |
| WO | 03076042 A1 | 9/2003 |
| WO | 2004035234 A1 | 4/2004 |
| WO | 2004069374 A1 | 8/2004 |

OTHER PUBLICATIONS

Aug. 9, 2010 Search Report from corresponding application GB1007165.2, 2 pages.
May 3, 2012 Examination Report from corresponding application GB1007165.2, 3 pages.
Aug. 22, 2012 Examination Report from corresponding application GB1007165.2, 2 pages.
Aug. 15, 2012 Response to Examination Report from corresponding application GB1007165.2, 7 pages.
Aug. 23, 2012 Response to Examination Report from corresponding application GB1007165.2, 15 pages.
Sep. 4, 2012 Notification of grant of patent from corresponding application GB1007165.2, 2 pages.
Apr. 23, 2012 Combined Search and Examination Report from corresponding application GB1205750.1, 3 pages.
Aug. 14, 2012 Response to Examination Report from corresponding application GB1205750.1, 1 page.
Aug. 28, 2012 Notification of grant of patent from corresponding application GB1205750.1, 2 pages.
Oct. 30, 2012 International Preliminary Report on Patentability (PCT/GB2011/050599).

* cited by examiner

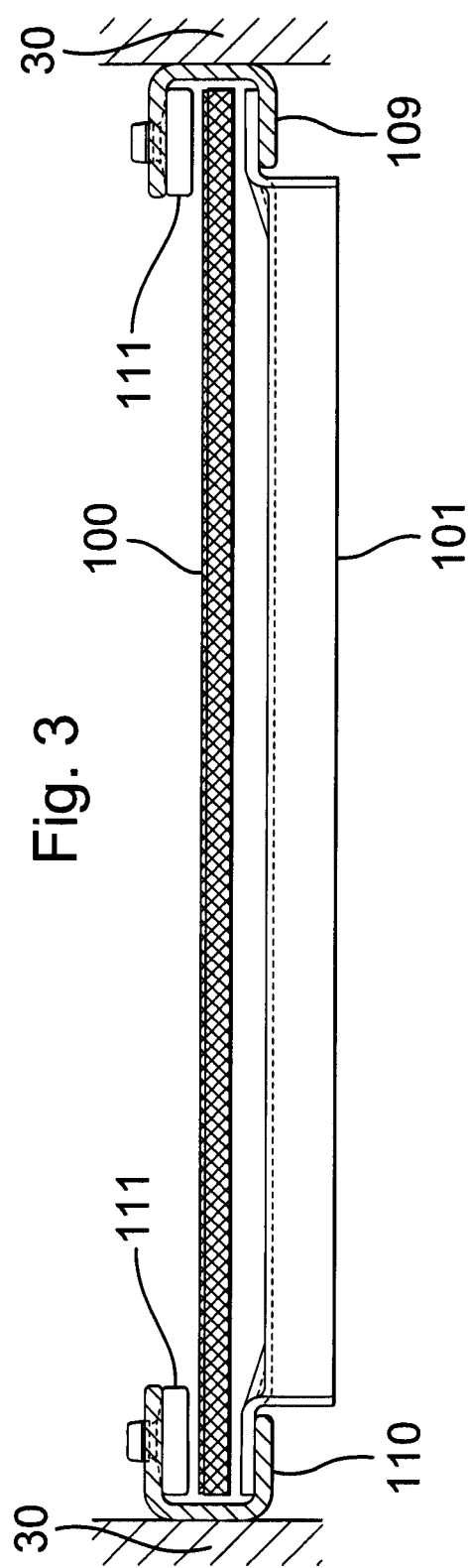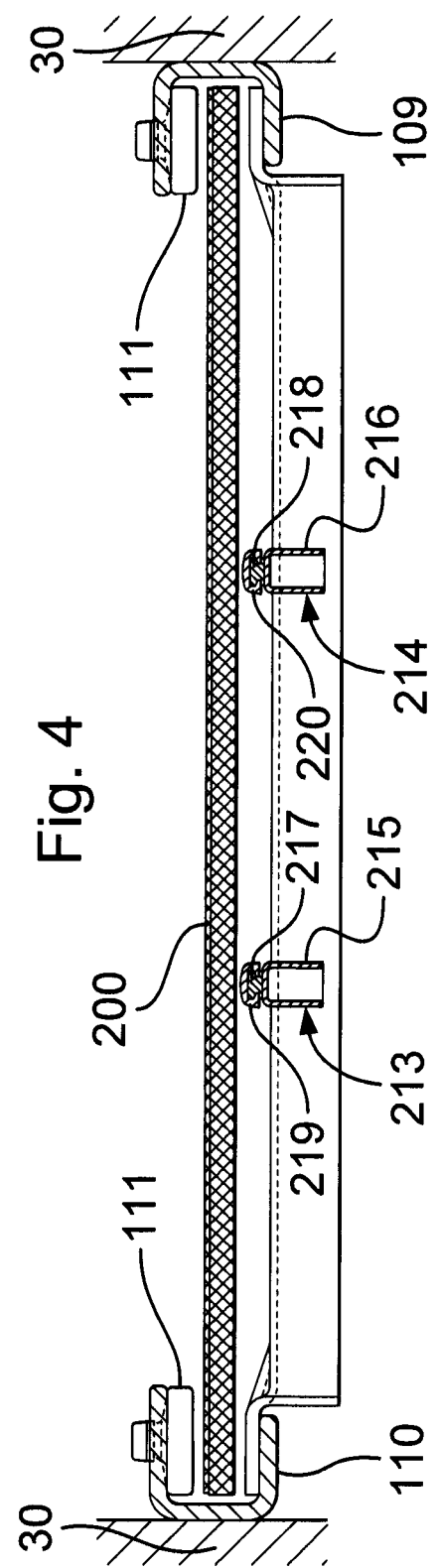

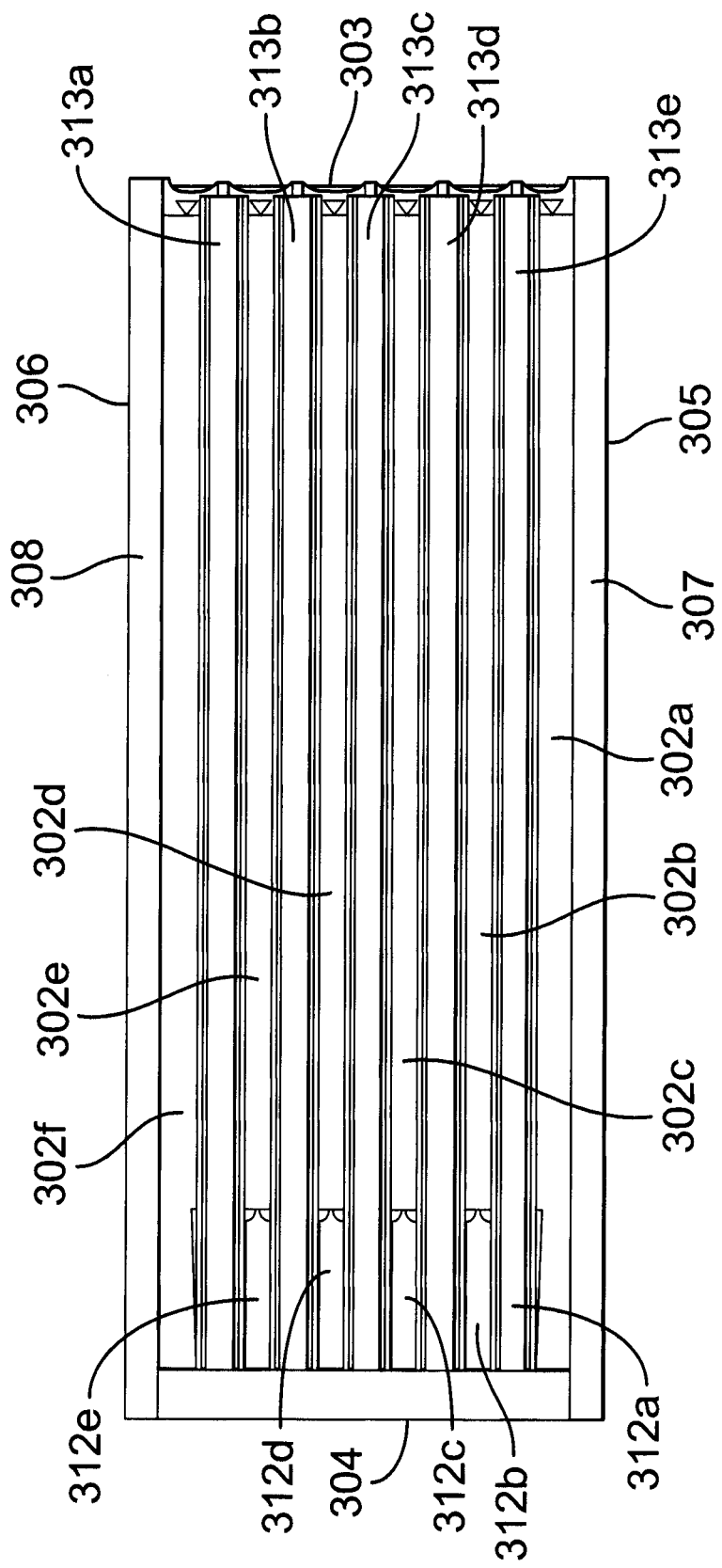

APPARATUS AND METHOD FOR SEPARATING SOLIDS FROM A SOLIDS LADEN DRILLING FLUID

CROSS-REFERENCE TO RELATED APPLICATION

This application claims the benefit of GB Patent Application No. 1007165.2, filed on Apr. 29, 2010, the entire contents of which are hereby incorporated by reference.

The invention relates to an apparatus and method for separating solids from a solids laden drilling fluid and particularly, but not exclusively an apparatus and method for separating solids from a solids laden drilling mud. The invention also relates to a shale shaker and screen assemblies therefor.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia the solids to be removed from the drilling mud. This is achieved by processing the drilling mud. The first part of the process is to separate the solids from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used to further clean the mud of solids. The solids are covered in contaminates and residues. It is not uncommon to have 30 to 100 m$^3$ of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

Shale shakers generally comprise an open bottomed basket having one open discharge end and a solid walled feed end. A number of rectangular screens are arranged over the open bottom of the basket. The screens may be substantially planar or have a slight crown. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces separation of the drilling mud from the solids, the drilling mud passing through the screens and the solids above the screens. The shaking motion also induces the solids to move along the screens towards the open discharge end. The recovered drilling mud is received in the receptor for further processing and the solids pass over the discharge end of the basket into the ditch or skip.

The rectangular screens may be arranged at an angle to horizontal, such as a seven degrees incline from the feed end to the discharge end of the shale shaker. The angle may be adjustable. The screens are generally fixed in the basket and the basket is adjustable to adjust the angle of the screens relative to horizontal. The flow of solids laden drilling fluid may form a pool on the inclined screens. The action of the vibratory mechanism induces solids to climb the inclined screens to the discharge end of the shaker and into the ditch or skip.

Generally, a vibratory mechanism inducing a circular vibration will tend to throw solids from the screen into the air in circular motions, which is often in shale shakers having a horizontal screen deck. A vibratory mechanism inducing an elliptical motion will induce the solids to move in a direction of the longest chord of the ellipse, which is often used in shale shakers having an inclined screen deck, such that in use movement of solids up the inclined screen deck is facilitated. A shale shaker having a vibratory mechanism inducing a very thin ellipse is known as a linear shale shaker and induces fast movement of solids along the screen, although the screen tends to suffer fast degradation due to sudden deceleration of the solids as they meet the screen.

The screens used in a shale shaker experience high acceleration values and heavy loading when processing drilling fluids. The high acceleration values are required in order to induce throughput through the screens and in order to convey the solids over the screen for discharge.

The shale shaker vibratory drive apparatus is sized in order to induce an optimal stroke profile based upon the total mass of assembly including the vibratory drive apparatus, basket, screens and solids laden drilling fluid therein i.e. all of the vibrated components, essentially the sprung mass. The screens are clamped or otherwise fastened to the basket and the screens support the solids laden drilling fluid to be processed.

The motion induced into the assembly is typically a simple harmonic motion, whereby starting from its lowest point the vibratory drive, basket, screens and solids laden drilling fluids are accelerated upwards typically in an elliptical motion, the longest chord of the ellipse set at around forty-five degrees towards the front of the basket by high positive acceleration forces reducing towards mid stroke where the acceleration values reduce to zero then negative deceleration occurs reducing the velocity to a minimum at the top of the stroke. This cycle is repeated on the downward stroke showing that high acceleration values, (positive and negative) are experienced at each tip of the stroke where the velocity is minimized and the acceleration values are zero at each mid-point of the stroke where the velocities are at their highest.

As the fluids are not physically attached to the screens the screen loading varies therefore dependent upon the stroke cycle. During the upward stroke the screen is accelerated into the fluid mass thereby inducing throughput then the screen accelerates away from the fluid mass on the downward stroke only for the fluid mass to drop onto the screens again at the bottom of the stroke due to gravity and the whole cycle is then repeated typically at approximately 1800 to 2000 rpm.

For optimal performance the screen overall should preferably move as one entity matching the stroke profile of the basket and any deflection should be minimized. Should the screen deflect then this can lead to far higher acceleration values being induced leading to premature wear and uneven loading across the width of the screen. Given that the motion is also utilized to convey solids across the screen, any additional deflection of the screen will result in uneven conveyance across the screen width.

Prior art has shown that the screen can span the distance between the screen clamps on the sides of the basket that are utilized in order to clamp the screen to the basket, but this requires a significant amount of materials in order to provide the rigidity required. The downside of this approach is that the screens are generally bigger and heavier, so not so good for manhandling and may be more expensive to manufacture.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948 and an example of a shale shaker suitable for receiving the pre-tensioned type screens is disclosed in GB-A-2,176,424.

WO 2004/035234 discloses a screen assembly for a shale shaker, the screen assembly comprising a panel and a support structure, the panel has an area provided with a multiplicity of apertures and at least one layer of screening material arranged over the multiplicity of apertures. The apertures have downwardly projecting tabs to provide rigidity to the panel. Tabs of adjacent apertures form panel ribs. The support structure comprises a plurality of transverse support ribs. Transverse panel ribs fit over the transverse support ribs. The panel is removable from the support structure.

WO 03/013690 and WO 2004/069374 disclose a screen assembly comprising a screen element and a separate support. The screen element comprising a mesh panel and side inclined support members having a downwardly inclined face. The support comprises a rigid frame having side inclined surfaces at each side. When in use, the screen assembly is slid into rails of a shale shaker. A pneumatic seal arranged in the rails is activated to push the side inclined support members on to the inclined surfaces of the rigid frame to tension the mesh panel over the support. The screen element may comprise a light weight flexible apertured plate.

A problem associated with shale shakers is that screens used therein tend to blind, especially when the solids are gummy, such as clay, or of a size close to the size of the mesh size of the screen. The latter type of blinding is known as near-sized particle blinding. A number of solutions have been proposed to tackle this problem, such as disclosed in GB-A-1,526,663 in which a screen assembly using two layers of screening material in a sandwich and allowing the layers of screening material to move independently to dislodge any near sized particles lodged in one of the screens. WO 01/76720 relating to the rotatable drum separator also discloses using air nozzles external to the perforate drum to provide positive pressure air through the perforate drum in the dry zone to ensure that the perforations do not clog with solids.

It is advantageous to use fine-meshed filters to filter very small particles, for example of a size in the range of 50-200µ or more, without the filtering device clogging up with the small particles. However, it is the fine-meshed filters in particular that are prone to such undesired clogging.

It is also advantageous to provide a separator which operates at low noise levels to comply with health and safety legislation. It is also advantageous to have a simple reliable separator to inhibit down-time for maintenance and repair.

It is preferable in certain circumstances to retain particles, for example of a particle size in the range of 50-60µ or larger, by means of a filter.

In the drilling of an oil or gas well, cracks may exist in the wall of the wellbore. Such cracks may propagate, which could cause structural problems in the wall of the wellbore and/or allow drilling fluids to escape therethrough into the formation. Furthermore, if substantial amounts of drilling fluids are lost, the pressure in the drilling fluid in the wellbore may drop, which could cause collapse of the wellbore. Accordingly, Wellbore Strengthening Materials may be added to circulated drilling fluid. The Wellbore Strengthening Materials comprise sized particles. When the drilling fluid is circulated around the wellbore wall with cracks therein, the sized particles wedge themselves in the cracks, which reduces the likelihood of the cracks propagating. It is beneficial to recover these sized particles and reuse them in circulated drilling mud. Shale shakers have thus been modified to size solids in solids laden drilling fluid. Such a shale shaker is disclosed in U.S. Ser. No. 12/490,492 US2010/0089652. A range of sizes of solids can be extracted using such a shale shaker and recirculated as Wellbore Strengthening Material in fresh drilling fluid.

In order to expedite screening of solids laden drilling mud, energy is required to be imparted to the solids laden drilling at the juncture where the filtering takes place, i.e. where the solids laden drilling mud meets the screen.

Prior art also shows that the basket configuration may be such that additional support is offered to the screen between sides of the basket, GB-A-2,206,501 thereby reducing the span of the screen hence reducing the rigidity required of the screen such that the screen can be made smaller and lighter.

US-A-2007/0187303 Bailey and Fisher, discloses a screen assembly for separating solids from solids laden drilling fluid, the screen assembly comprising a screen element and a support frame insertable into a clamp apparatus of a shale shaker. The support frame has a plurality of support elements. The screen element comprises mesh panels having longitudinal cranked edge portions which, in use, are clamped between inclined surfaces of the support frame to fix the mesh panels over the support elements therebetween. It should be noted that, in use, screened fluid flows through the screen element and support element.

GB-A-2,425,743 Burnett, discloses a screen assembly for separating solids from solids laden drilling fluid, the screen assembly shown in FIG. 1 thereof comprises a screen panel for receiving screening material and a screen support insertable into a clamp apparatus of a shale shaker. The screen panel comprises longitudinal inverted T-rails which are pulled down on to the screen support by action of being clamped in the clamp apparatus of the shale shaker. The screen assembly shown in FIG. 2 of GB-A-2,425,743 comprises a screen panel with screening material thereon and a separate screen support having crown ribs insertable into a clamp apparatus of a shale shaker. The screen panel clamped on to the screen support in the clamping apparatus of the shale shaker. It should be noted that, in use, screened fluid flows through the screen element and support element.

The present invention offers increased support to the screens by minimizing the span between supports and the use of tapered surfaces encourages the screen to wedge itself into the support structure. This in conjunction with the increased contact area between the screen and the support arrangement dictate that the friction forces to be overcome when lifting the screen from the support arrangement are higher than that required for a simple point contact arrangement.

For the simple point contact arrangement the reaction forces acting on the screen and support structure are vertical only such that support is given during the upward stroke of the basket only.

The tapered surfaces proposed dictate that the reaction forces are angled perpendicular to the angled faces and that equivalent loads can be calculated comprising of a vertical component and a horizontal component. The horizontal component reacts against the screen and is an additional force to be overcome as the screen deflects under its own weight during the downward stroke of the basket. Maximizing this force therefore will help minimizing screen deflection during the downward stroke.

According to the present invention, there is provided an apparatus for separating solids from solids laden drilling fluid, the apparatus comprising a shale shaker and a screen assembly, the shale shaker comprising a flow tray for directing screened drilling fluid, the screen assembly comprising at least one layer of screening material, a support and a perimeter with at least one support point within the perimeter, characterized in that the flow tray comprises at least one raised portion to support the screen assembly. Thus the flow tray is preferably used as a Structural component to increase the rigidity of the screen assembly.

Preferably, the flow tray is arranged at an angle between horizontal and twenty five degrees from horizontal and most preferably, between five and fifteen degrees, advantageously, twelve degrees. Advantageously, the flow tray directs screened drilling fluid to the feed end of the basket whereupon preferably, the screened drilling fluid is directed into at least one duct and preferably into a duct of a flow distributor apparatus. Preferably, the screen assembly lies in a first plane and the flow tray lies in a second plane, the screen assembly in the first plane diverging from the flow tray in the second plane. Advantageously, the first and second planes diverge at an angle of between one and ten degrees. Preferably, the flow tray comprises a series of raised portions configured to support the screen assembly lying at the diverging angle to the flow tray.

Preferably, the at least one raised portion comprises at least one wear strip. Advantageously, the flow tray is made from a composite material. Advantageously, the at least one raised portion defines flow channels for directing the screened drilling fluid along the flow tray. Preferably, the raised portion forms a longitudinal wall spanning at least a major portion and advantageously the entire length of the flow tray. Preferably, the flow tray is substantially the same length as the screen deck on which the screen assembly or screen assemblies lie in use. Alternatively, the flow tray has a length which is a major portion of the length of the screen deck. Preferably, the flow channels are tapered to facilitate flow of screened drilling mud. Preferably, tapered in depth, the flow channels have a high underside at a first end and a low height at the second end at which the screened drilling fluid is discharged. Considerable longitudinal forces are induced in the screen assembly by the vibratory mechanism in use. The tapered portions preferably fit over corresponding tapered portions, thus providing a large contact area. The large contact area provides a high degree of surface tension and thus inhibits movement of the screen assembly relative to the screen deck and hence the basket, whilst still allowing easy insertion of the screen assemblies when replacing the screen assemblies.

Advantageously, the shale shaker comprises a basket, the flow tray fixed to the basket. Preferably, the basket comprises sides, the flow tray fixed to the sides. Advantageously, the sides each have a rail, the flow tray supported on the rail. Preferably, the flow tray is adhered, riveted, screwed, glued, welded or otherwise fixed to the rail and/or sides. Alternatively, the flow tray is removable from the basket, preferably slidably removable.

Preferably, the flow tray comprises a plurality of contours, at least one of the contours forms the at least one of the raised portion.

Advantageously, the at least one raised portion is a plurality of raised portions. The more raised portions, the better the support for the screen assembly, although the flow channels need to be sized to remove the throughput of screened drilling mud, which can be in the order of a thousand gallons per minute.

Preferably, the screen support comprises a tapered surface. Advantageously, the at least one raised portion comprises a tapered support surface to receive the tapered surface of the screen support. Preferably, the tapered surface is formed from a sheet material, which may be sheet metal folded to form a tapered surface. Preferably, the sheet material has openings therein to allow screened drilling mud to flow through the screening material.

U.S. Pat. No. 6,454,099 B1 Adams, discloses screen assemblies for a shale shaker for separating solids from solids laden drilling fluid, the screen assemblies having hookstrips with support strips and screening material arranged therebetween. The screening material has raised portions therein.

U.S. Pat. No. 6,302,276 B1 Seyffert, discloses a screen assembly for a shale shaker for separating solids from solids laden drilling fluid, the screen assembly having a strip support with strips arranged across the shaker and having raised portions to support screening material having undulations therein, the undulations running parallel with the sides of the screen assembly. Also disclosed in a screen assembly comprising replaceable panels.

The present invention also provides an apparatus for separating solids from solids laden drilling fluid, the apparatus comprising a shale shaker and a screen assembly, the shale shaker comprising a basket having side supports and at least one intermediate support arranged between the side supports, the screen assembly comprising a screen support supporting at least one layer of screening material, the screen support having at least two sides to be supported by the side supports and at least one support member between the sides for engaging with the at least one intermediate support, characterized in that the screen support comprises a tapered surface and the at least one intermediate support has a tapered support surface, such that, in use, the tapered surface and the tapered support surface abut. Preferably, this arrangement inhibits lateral and tangential movement of said screen assembly in said basket. Advantageously, the tapered surface or tapered surfaces are substantially planar, although they may be curved; comprise ridges; and/or have a roughened surface. Preferably, the further tapered surface is of the same magnitude as the angle from the horizontal as the tapered surface. Advantageously, the further tapered surface is of a different magnitude as the angle from the horizontal as the tapered surface. Preferably, the angles of the tapered support surface and further tapered support surface are the same or substantially the same to obtain a large surface area of contact therebetween.

Preferably, the screen support comprises a further tapered surface at an opposing angle to the tapered surface and the at least one intermediate support has a further tapered support surface at an opposing angle to the tapered support surface, such that, in use, the tapered surface and further tapered support surface abut the tapered support surface and the further tapered support surface. Advantageously, the tapered surface and the further tapered surface of the screen support diverge from the screen support, preferably diverging at an acute angle, although they may be at an obtuse angle. Preferably, the tapered support surface and the further tapered support surface of said intermediate support converge from the intermediate support, advantageously at a converging acute angle, although they may be at an obtuse angle.

The present invention also provides a screen assembly comprising at least one layer of screening material, a screen support and a perimeter with a plurality of support points within the perimeter characterized in that at least one of the support points comprises a tapered surface.

Preferably, the tapered surface lies in a plane which is between ten and eighty degrees from horizontal. Advantageously, the tapered surface lies in a plane which is between forty and seventy degrees from horizontal.

Advantageously, the screen assembly comprises a further tapered surface at an opposing angle to the tapered surface and the at least one intermediate support has a further tapered support surface at an opposing angle to the tapered support surface, such that, in use, the tapered surface and further tapered surface abut the tapered support surface and the further tapered support surface. Preferably, this arrangement inhibits lateral movement of said screen assembly in said basket. Preferably, the further tapered surface is of the same magnitude as the angle from the horizontal as the tapered surface. Advantageously, the further tapered surface is of a different magnitude as the angle from the horizontal as the tapered surface.

The present invention also provides a shale shaker comprising a base, a basket isolated from the base, a vibratory apparatus for vibrating the basket and screen deck in the basket and a flow tray for directing screened solids laden drilling mud characterized in that the that the flow tray comprises at least one raised portion to support the screen assembly.

Preferably, the basket further comprises a second screen deck, the flow tray directing solids laden drilling fluid thereon.

The present invention also provides a method of using the apparatus of the invention, the method comprising the step of placing the screen assembly in the basket of the shale shaker, flowing solids laden drilling fluid on to the screen assembly, at least a proportion of the solids flowing over the screen assembly and at least a proportion of said drilling fluid passing through said screen assembly.

For a better understanding of the present invention, reference will now be made, by way of example, to the accompanying drawings, in which:

FIG. 3 is a schematic end view, partly in section of a screen deck, a flow tray and a screen assembly;

FIG. 4 is a schematic end view, partly in section of a screen deck, a flow tray and a screen assembly in accordance with the invention;

FIG. 5 is a schematic end view, partly in section of a screen deck, a flow tray and a screen assembly in accordance with the invention; and FIG. 6 is a schematic end view, partly in section of the flow tray shown in FIG. 5 spaced from the screen assembly shown in FIG. 5;

FIG. 6A is a top plan view of the flow tray shown in FIG. 5;

Figure 1:
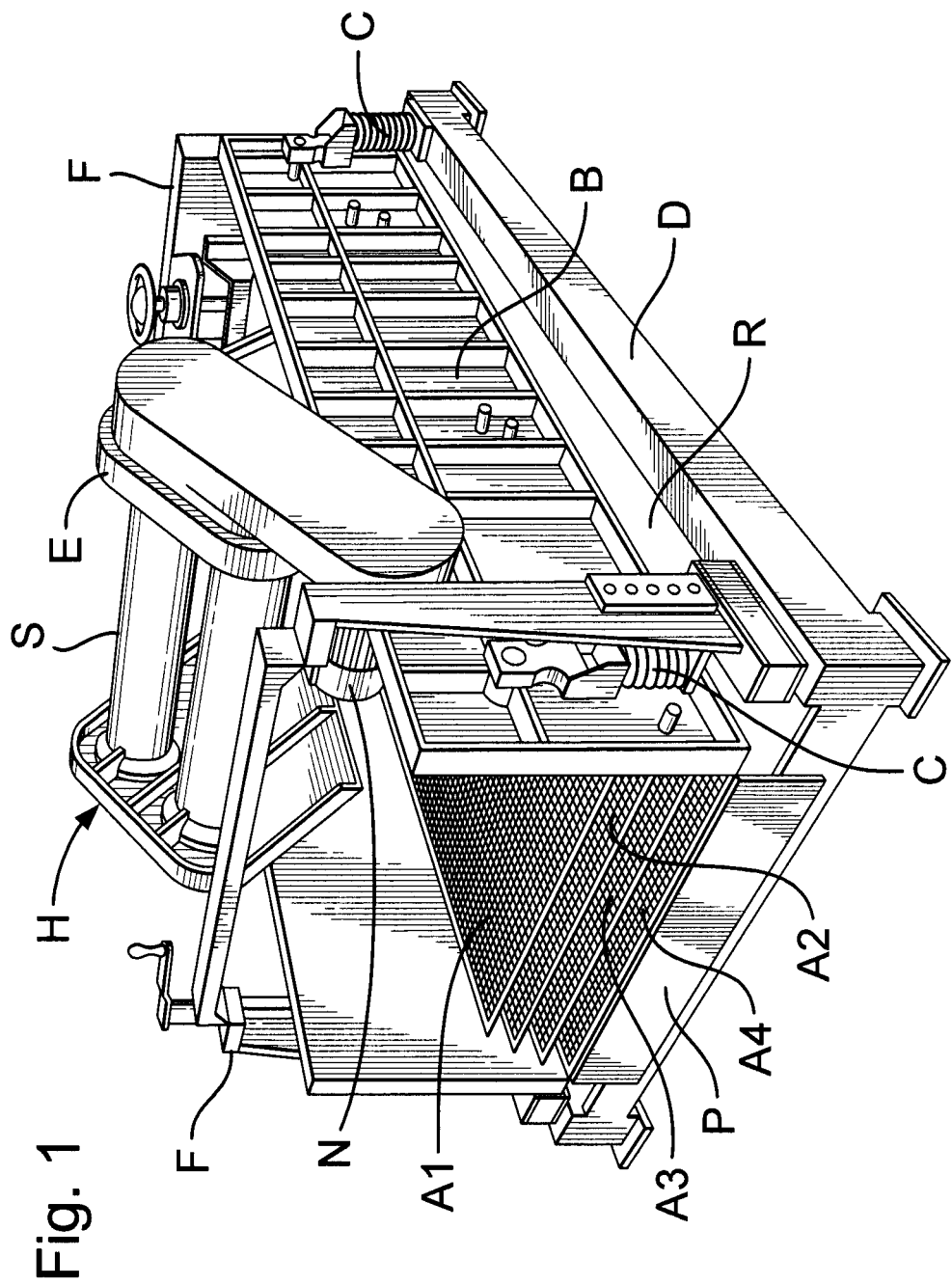
FIG. 1 shows a perspective view of an apparatus for separating solids from solids laden drilling mud.

FIG. 1 shows an apparatus for separating solids from a solids laden drilling mud, generally referred to as a shale shaker and identified herein by reference H. The shale shaker H comprises a base D having an open bottom R arranged above a collection receptacle (not shown) for receiving screen drilling mud. A basket B is arranged on springs C on the base D. A vibratory apparatus E is arranged on top of the basket B. The vibratory apparatus E comprises an electric or hydraulic motor (not shown) rotating offset clump weights hidden within casing S, which induce a motion in the basket B. An upper, upper middle, lower middle and lower screen assemblies A1, A2, A3, A4 are arranged in the basket B and fixed thereto in rails (not shown) so that the motion induced in the basket is transferred to the screen assemblies A1, A2, A3, A4. Solids laden drilling fluid is fed on to the screen assemblies A1-A4 from a feed chamber F at a feed end of the apparatus. The motion induced in the screen assemblies A1-A4 facilitates separation of solids from drilling mud. Screened drilling mud passes through the screen assemblies into the collection receptacle (not shown) and solids climb along the screen assemblies A1-A4 to a discharge end P of the shale shaker and into a skip, ditch or other cuttings transfer apparatus (not shown).

Figure 2A:
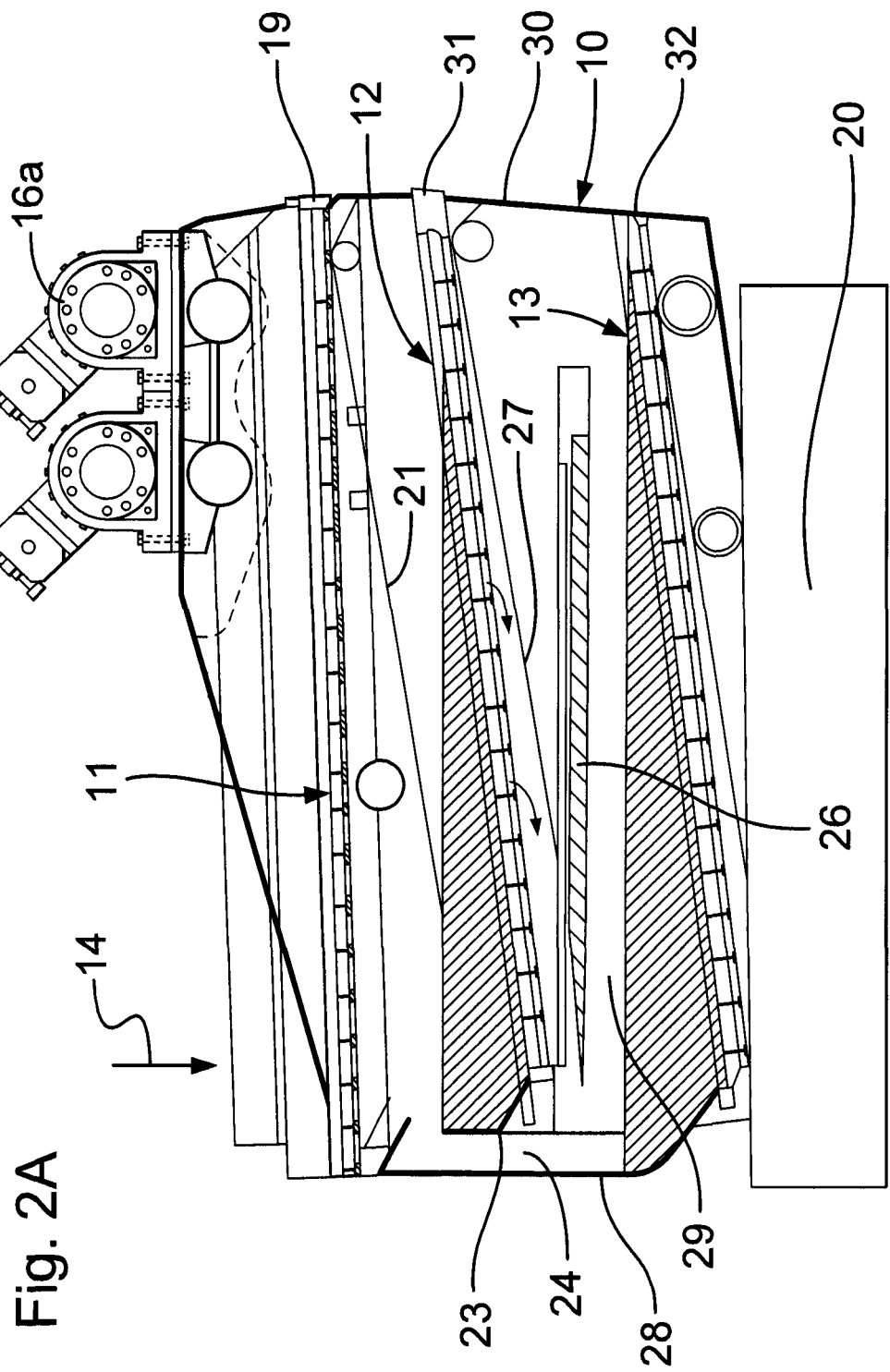
FIG. 2A is a side cross-sectional schematic view of an apparatus for separating and sizing solids from solids laden drilling mud, the apparatus comprising a base and a basket floating thereon.
Figure 2B:
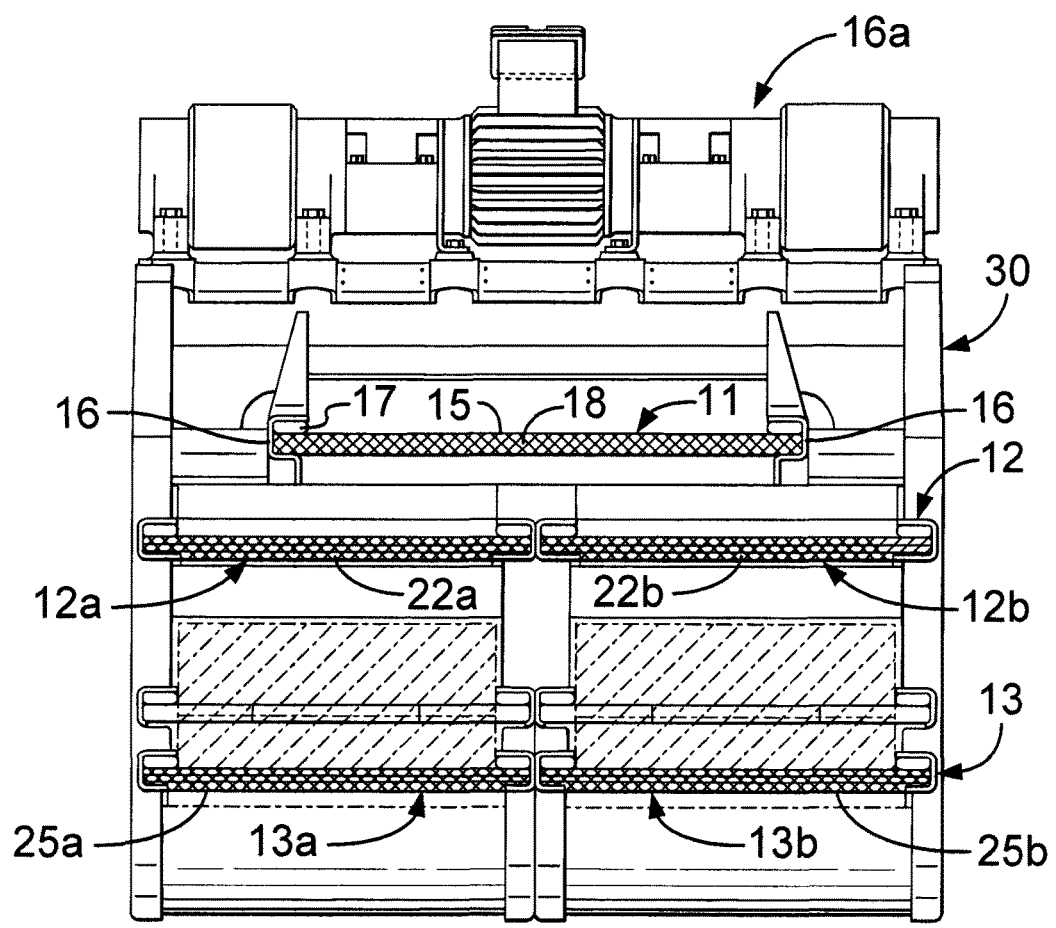
FIG. 2B is an end view of the basket shown in FIG. 2A showing screen decks and screen assemblies therein.

FIGS. 2A and 2B show a shale shaker 10 having a base 20 and a basket 30 arranged thereon on springs (not shown).

The basket 30 comprising a scalping deck 11, an upper primary deck 12 and a lower primary deck 13. The upper primary deck 12 has a left-hand side 12a and a right-hand side 12b. The lower primary deck has a left-hand side 13a and a right-hand side 13b. Solids laden drilling fluid is introduced to a feed end of the shale shaker 14 from a feeder (not shown) on to a scalping screen 15 arranged in C-shaped channels 16 of the scalping deck 11. An expandable pneumatic bladder 17 is arranged in a top part of the C-shaped channels 16 to clamp the scalping screen 15 therein. Alternatively, a wedge may be used to secure the scalping screen 15 in the C-shaped channels 16. The scalping screen 15 comprises a screen 18 having relatively large openings for inhibiting large particles from passing though on to the primary decks, but allowing some solids and drilling mud therethrough. The scalping deck 11 and the screen 15 thereon is arranged at an uphill tilt of approximately two degrees from horizontal, although the scalping screen 15 and scalping deck 11 may be arranged horizontally, slightly downhill or at a slightly greater uphill angle. Vibratory apparatus 16a fixed to the basket 30 induces motion therein. The motion facilitates separation of large solids from the solids laden drilling mud and induces movement in the large solids along the scalping screen 15 from the feed end 14 to the discharge end 19 of the shale shaker. The large solids may be caught in a ditch or on a conveying means and further processed or used in other operations. The solids laden drilling fluid which passes through the scalping screen 15 falls on to a flow tray 21 which directs the solids laden drilling fluid to the feed end 14 of screen assemblies 22a and 22b in the upper primary deck 12. A weir 23 is arranged at the feed end of the primary deck 12 to retain the solids laden drilling fluid. If the level of the solids laden drilling fluid rises beyond the height of the weir 23, solids laden drilling fluid passes thereover into a duct 24 and on to screen assemblies 25a and 25b in the lower primary screen deck 13. The screen assemblies 22a, 22b and 25a and 25b are preferably of the same type and have the same screen mesh thereon.

A gate valve 26 in the form of a slideable tray, is in a closed position, closing off a duct 29, to run the shale shaker in a parallel mode. Screened drilling mud falls through the screen assemblies 22a and 22b in the upper screen deck on to a flow tray 27 and over the closed gate valve 26 and into a duct 28 which runs parallel to the duct 24. However, duct 28 leads to the bottom of the basket and directly into the collection receptacle (not shown) therebelow. Solids fall off the discharge end 31 of upper screen deck 12 and discharge end 32 of the lower screen deck 13 and into a skip or other conveying apparatus for conveying the solids for further processing or re-use.

The gate valve 26 may be retracted to allow drilling mud screened by the screen assemblies 22a and 22b in the upper screen deck 12 to be further screened by screen assemblies 25a and 25b on the lower screen deck 13. The shale shaker thus runs in a series mode. In this situation, it is preferable to use a finer screen mesh in the screen assemblies 25a and 25b than the screen mesh used in screen assemblies 22a and 22b. Drilling mud screened by the screen assemblies 22a and 22b in the upper screen deck 12 flows in the flow tray 27 and into a duct 29, which directs the screened drilling mud on to the feed end of the screen assemblies 25a and 25b in the lower screen deck 13. Sized solids fall off the discharge end 31 of upper screen deck 12 into a conveyor (not shown) to be conveyed and mixed into a fresh batch of drilling mud for re-circulation. These sized solids are used to block cracks in the formation as hereinbefore described.

Solids discharges from the discharge end 32 of the lower screen deck 13 are conveyed in a separate conveyor or added to a skip for further processing or used for other purposes.

Figure 3A:
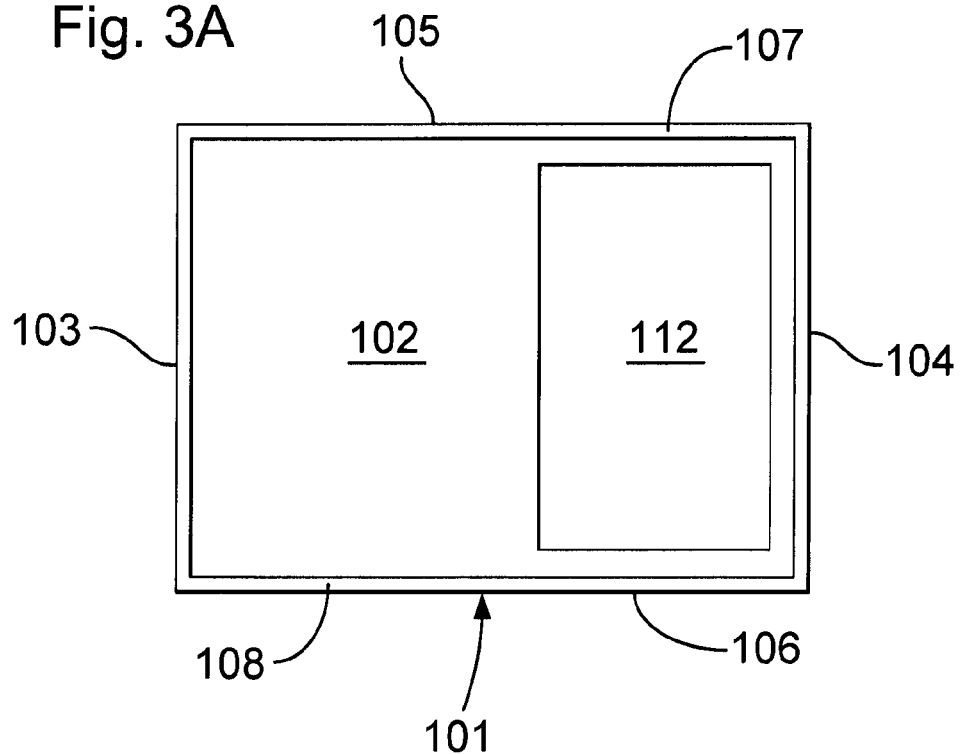
FIG. 3A is a top plan view of the flow tray shown in FIG. 3.

Referring to FIGS. 3 and 3A, there is shown a screen assembly 100 and a flow tray 101. The flow tray 101 comprises a recessed zone 102, a closed end 103, an open end 104 and a pair of sides 105 and 106. The sides 105 and 106 comprise flanged portions 107 and 108, which flanged portions 107 and 108 are slid into C-shaped channels 109 and 110 in basket 30 and fixed therein. Preferably, the flanged portions 107 and 108 are glued or otherwise adhered to the C-shaped channels 109 and 110, but may be slidably removable from the channels and fixed with the screen assembly 100 by expandable pneumatic hose seal 111. The recessed zone 102 may have a substantially horizontal planar base, which when fixed in said C-shaped channels 109 and 110, assumes a slope equal to the slope of the screen assembly 100, which is preferably seven degrees. The tray also has an opening 112 therein. The gate valve 26 of the shale shaker 10 selectively prevents and allows screened drilling mud through the opening 112.

Figure 4A:
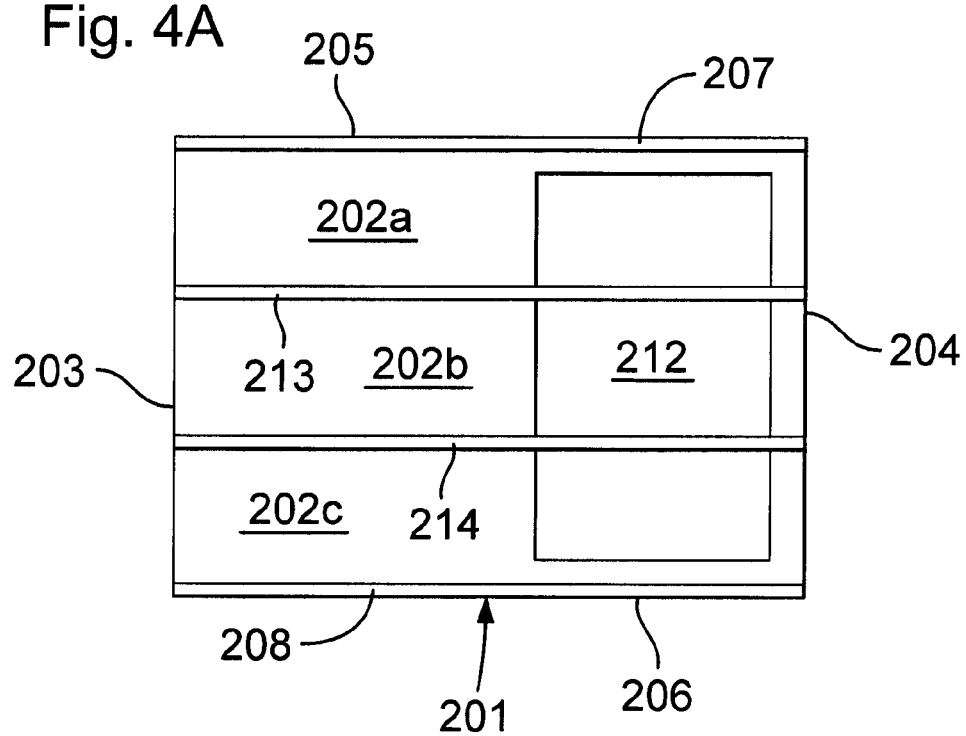
FIG. 4A is a top plan view of the flow tray shown in FIG. 4.

FIG. 4 shows a screen assembly 200 and a flow tray 201 in accordance with the present invention. The flow tray 201 comprises three recessed zones 202a, 202b and 202c, a closed end 203, an open end 204 and a pair of sides 205 and 206. The sides 205 and 206 comprise flanged portions 207 and 208, which flanged portions 207 and 208 are slid into C-shaped channels 109 and 110 in basket 30 and fixed therein. Preferably, the flanged portions 207 and 208 are glued or otherwise adhered to the C-shaped channels 109 and 110, but may be slidably removable from the channels and fixed with the screen assembly 200 by expandable pneumatic hose seal 111. The recessed zones 202a, 202b and 202c may have a substantially horizontal planar base, which when fixed in said C-shaped channels 109 and 110, assumes a slope equal to the slope of the screen assembly 200, which is preferably seven degrees. The tray also has an opening 212 therein. The gate valve 26 of the shale shaker 10 selectively prevents and allows screened drilling mud through the opening 212. A pair of intermediate supports 213 and 214 bind the recessed zones 202a, 202b and 202c. The supports 213 and 214 comprise upstands 215 and 216 spanning the length of the flow tray 201. The upstands each have a T-connector 217 and 218 fixed thereto or integral therewith, with a wear strip arranged thereon. The wear strip may be any hard wearing material such as HDPE. A top of the wear strips 219 and 220 lie slightly above the top of the flanged portion 207 and 208 of the flow tray, preferably by 2 or 3 mm at the center. The screen assembly 200 sits on top of the wear strips 219 and 220 and is held thereon by inflation of the inflatable pneumatic hose 111 in the C-shaped channels 109 and 110. Structural rigidity of said flow tray is thus used in supporting the screen assembly 200.

Figures 5, 6:
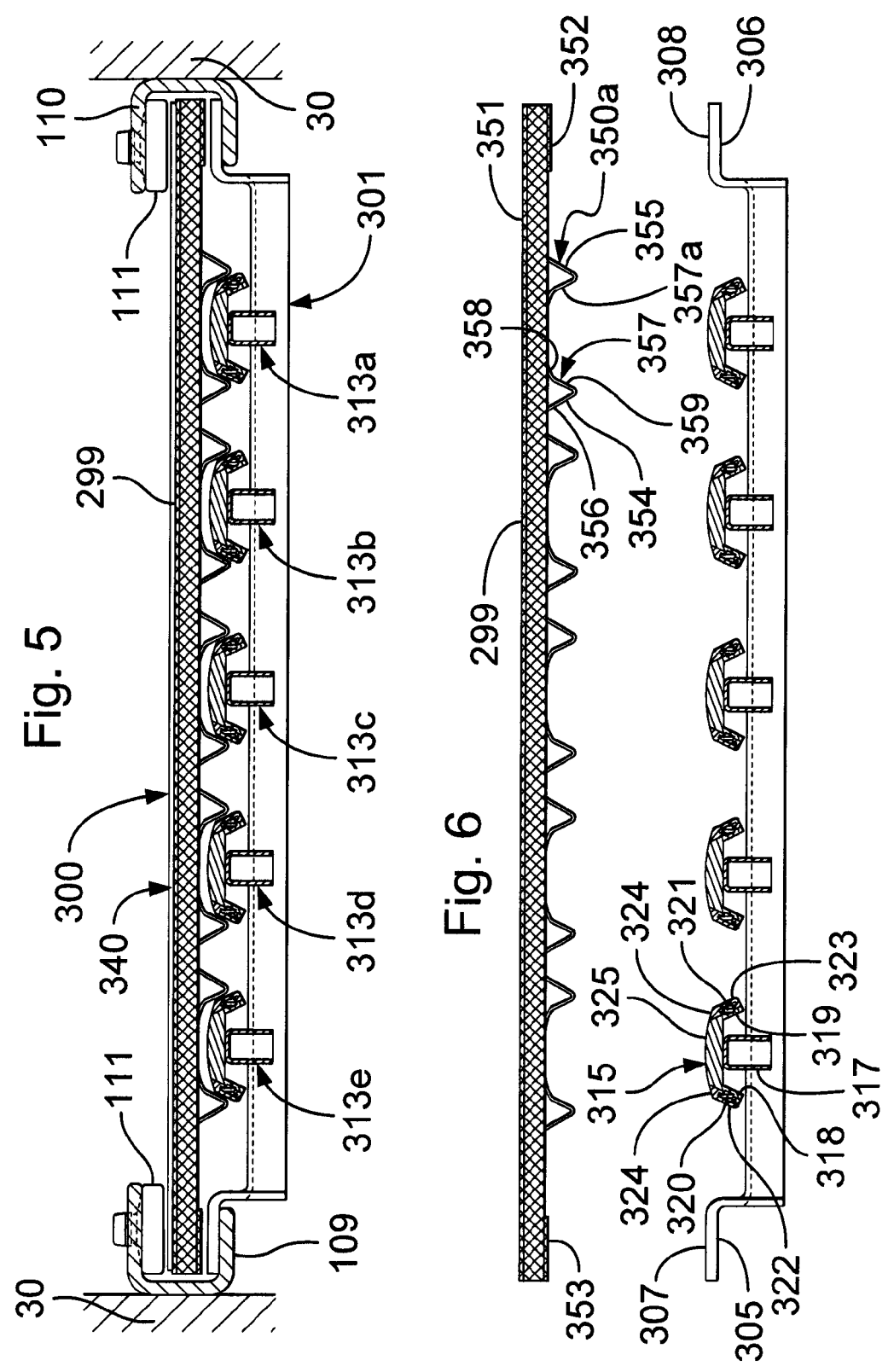
Figure 6B:
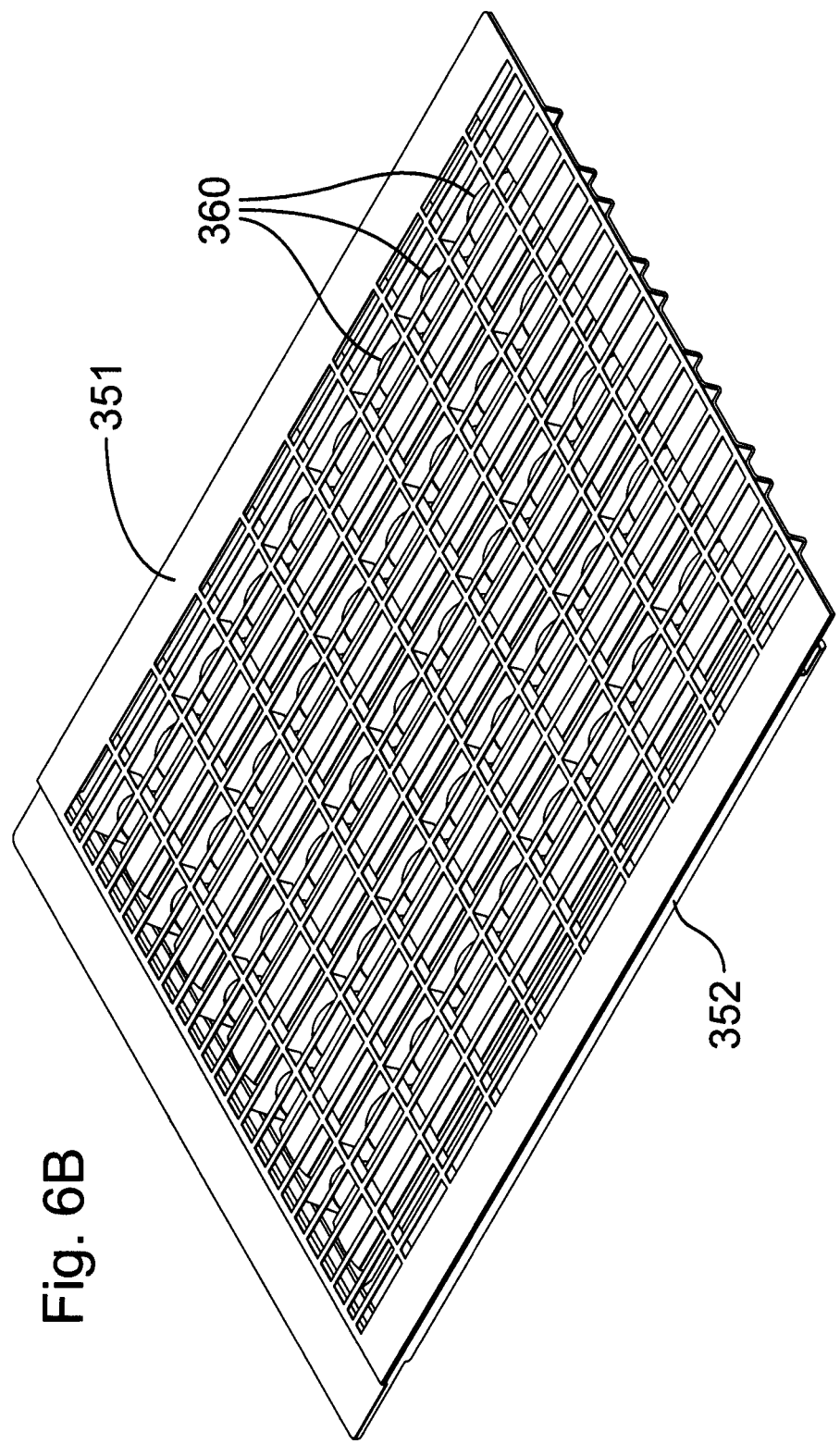
FIG. 6B is a perspective view of the screen assembly shown in FIG. 5.

FIGS. 5 to 6B show a screen assembly 300 and a flow tray 301 in accordance with the present invention. The flow tray 301 comprises six recessed zones 302a, 302b 30 302c, 302d, 302e and 302f, a closed end 303, an open end 304 and a pair of sides 305 and 306. The sides 305 and 306 comprise flanged portions 307 and 308, which flanged portions 307 and 308 are slid into C-shaped channels 109 and 110 in basket 30 and fixed therein. Preferably, the flanged portions 307 and 308 are glued or otherwise adhered to the C-shaped channels 109 and 110, but may be slidably removable from the channels and fixed with the screen assembly 300 by expandable pneumatic hose seal 111. The recessed zones 302a to 302f may have a substantially horizontal planar base, which when fixed in said C-shaped channels 109 and 110, assumes a slope from the discharge end 31 to the feed end 14 of the shale shaker equal to the slope of the screen assembly 200, which is preferably seven degrees. The tray also has opening 312a, 312b, 312c and 312d therein. The gate valve 26 of the shale shaker 10 selectively prevents and allows screened drilling mud through the opening 312a to 312d. Five intermediate supports 313a, 313b, 313c, 313d and 313e bind the recessed zones 302a to 302e. Only support 313e will be described in detail herein, although it should be noted that all the structural support members 313a to 313e are as described for structural support member 313e. The support 313 comprises an upstand 317 spanning the length of the flow tray 301. The upstand 317 has a strip 315 fixed or integral with the upstand 317. The strip 315 has two sides each having a tapered portion 318 and 319. The taper of each tapered portion 318, 319 is preferably at an acute angle from the plane of the flow tray 301, preferably between ten and eighty degrees, advantageously, forty-five to seventy degrees and most preferably sixty to seventy degrees from a horizontal plane. Each tapered portion 318 and 319 has there along a T-shaped member 320 and 321 fixed thereto or integral therewith, with a wear strip 322 and 323 arranged thereon. The tapered portions 318 and 319 each taper at a converging angle from the flow tray 301. The wear strips 322 and 323 may made from a hard wearing material such as HDPE. A top 325 of the strip 315 lies slightly above the top of the flanged portion 307 and 308 of the flow tray, preferably by 2 or 3 mm at the center support 313c, 1 to 2 mm on the adjacent supports 313b and 313d and 0.5 to 1 mm on the outer supports 313a and 313e. The wear strips 322 and 323 have a chamfered portion 324, and the top 325 of the strip 315 has a slight crown. The chamfered portions 324 provide a smooth transition between the top 325 and the wear strips 322 and 323.

The screen assembly 300 comprises a screen support 340 comprising a perforate plate 351, such as a perforate plate of metal or perforate plastics or perforate composite material. The perforations in the perforate plate 351 may be rectangular, as shown and which is preferred or any other suitable shape, such as octagonal, hexagonal, triangular, square, round. At least one layer of screening material 299 is adhered or otherwise attached to a top surface of the perforate plate 351. The at least one layer of screening material 351 may be two layers of screening material of equal mesh size and may be supported on a supporting layer of screening material having a larger mesh size and large gauge wires.

The screen support 340 comprises outer tubular frame members 352 and 353 along each side of the screen support. Each tubular frame member 352 and 353 is of hollow rectangular cross-section. Structural support members 350a to 350e are welded or otherwise attached or integral with the perforate plate 351. Only structural support member 350a will be described in detail herein, although it should be noted that all the structural support members 350a to 350e are as described for structural support member 350a. Structural support member 350a is symmetrical having a first side 354 and a second side 355 which are mirror images of each other. The first side 354 has an outer tapered portion 356 arranged in a plane at approximately sixty degrees from horizontal. A top edge of the outer tapered portion 356 is welded or otherwise attached to the perforate plate 351. An inner tapered portion 357 is linked to the other side 355 with a curved portion 358. The inner tapered portion 357 of side 354 and the inner tapered portion 357a of side 355 diverge from the perforate plate 351. The curved portion 358 is shaped such that, in use, it sits over the crowned top 325 and chamfered portions 324 of the wear strips 322 of each support 313a to 313e of the flow tray 301. The curved portion 358 is not fixed to the perforate plate 351 and stands clear with a gap therebetween. The lower part 359 lies in a plane of approximately sixty-five degrees from horizontal to conform to an outer face of the wear strip 324 on the tapered portion 318 of each support 313a to 313e. The structural support members 350a to 350e further comprise a curved portion 358 linking the two sides 354 and 355. The structural support members 350a to 350e have a plurality of openings 360 therein to allow fluid to flow therethrough on to the flow tray 301. The structural support members 350a to 350e may be made from sheet metal such as galvanized steel and may be formed by folding the sheet metal. The openings 360 may be punched or laser cut in the sheet metal prior to folding. Alternatively, the structural support members 350a to 350e may be formed from a composite material such as a fiber reinforced material such as KEVLAR™.

In use, the screen assembly 300 is inserted into the C-shaped channels 109 and 110 above the flow tray 301. The inner tapered portions 357 of the structural support members 350a to 350e slide along their respective wear strips 322a to 322e and 323a to 323e during insertion and then sit thereon. The screen assembly 300 is clamped in place by inflation of the inflatable pneumatic hose 111 in the C-shaped channels 109 and 110. Inflation of the pneumatic hose 111 pushes the sides of the screen assembly 300 on to the flanged portions 307 and 308 of the flow tray 301 and the inner tapered portions 357 of the structural support members 350a to 350e slide down their respective wear strips 322 and 323 to 323e to achieve a tight fit. Gaps between the top 325a to 325e and the screen support are likely due to tolerances in the relative size and location of the structural support members 350a to 350e and the supports 313a to 313e of the flow tray 301. However, the abutment of the inner tapered portions 357 of the structural support members 350a to 350e and their respective wear strips 322 and 323 provide a large contact area for supporting the screen assembly 300. Furthermore, the screen assembly 300 is inhibited from lateral movement in the basket 30 of the shale shaker.

Figure 7:
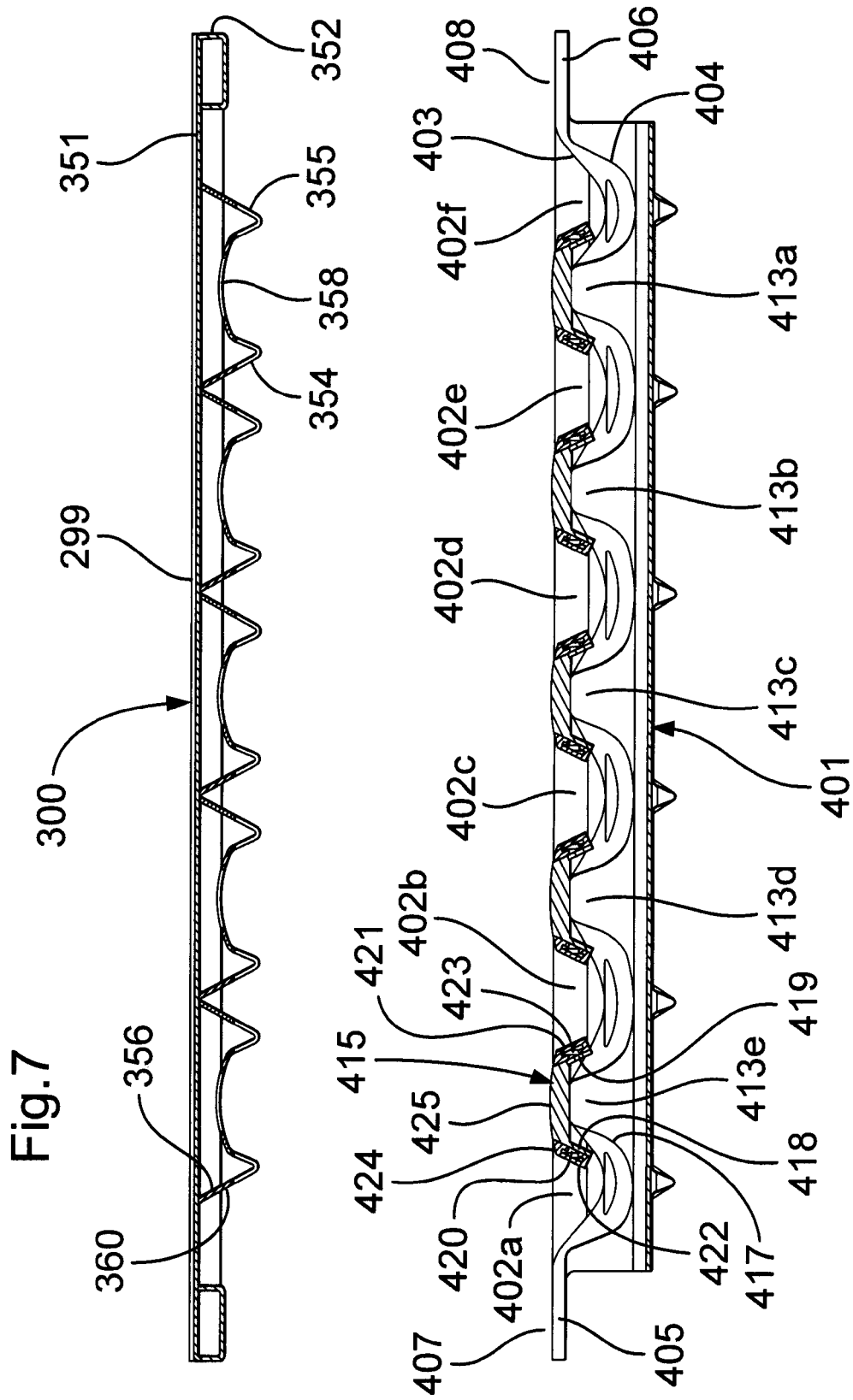
FIG. 7 is a schematic end view in cross section of the screen assembly shown in FIG. 5, spaced from a flow tray in accordance with the present invention.

FIG. 7 shows the screen assembly 300 shown in Figure FIGS. 5 to 6B with a flow tray 401. The flow tray 401 comprises a comprises six recessed zones 402a, 402b 402c, 402d, 402e and 402f to facilitate flow of drilling fluid therealong, a far end 403, an open end 404 and a pair of sides 405 and 406. The sides 405 and 406 comprise flanged portions 407 and 408, which flanged portions 407 and 408 are slid into C-shaped channels 109 and 110 in basket 30 and fixed therein. Preferably, the flanged portions 307 and 308 are glued or otherwise adhered to the C-shaped channels 109 and 110 and may by riveted or mechanically fixed, but may be slidably removable from the channels and fixed with the screen assembly 300 by expandable pneumatic hose seal 111. The recessed zones 402a to 402f have an undulating profile which taper in depth from the far end 403 to the open end 404, which assumes a slope from the discharge end 31 to the feed end 14 of the shale shaker greater than the slope of the screen assembly 300. The slope of the screen assembly may be adjustable between ten degrees uphill and one degree downhill, but is preferably fixed at seven degrees uphill. The flow tray 401 also has an opening (not shown) therein. The gate valve 26 of the shale shaker 10 selectively prevents and allows screened drilling mud through the opening. Five intermediate supports 413a, 413b, 413c, 413d and 413e bind the recessed zones 402a to 402e. The flow tray 401 is preferably formed in a mold with composite material, such as KEVLAR™. Only support 413e will be described in detail, although it should be noted that all the structural support members 413a to 413e are as described for structural support member 413e. The support 413 comprises an upstand 417 molded into the composite flow tray 401 spanning the length of the flow tray 401. The upstand 417 has a strip 415 fixed or integral with the upstand 417. The strip 415 has two sides each having a tapered portion 418 and 419. The taper of each tapered portion 418, 419 is preferably between ten and eighty degrees, and preferably forty-five to seventy degrees and most preferably sixty to seventy degrees from horizontal. Each tapered portion 418 and 419 has therealong a T-shaped member 420 and 421 fixed thereto or integral therewith, with a wear strip 422 and 423 arranged thereon. The wear strips 422 and 423 may made from a hard wearing material such as HDPE. A top 425 of the strip 415 lies slightly above the top of the flanged portion 407 and 408 of the flow tray, preferably by 1 to 3 mm. The wear strips 422 and 423 have a chamfered portion 424, and the top 425 of the strip 415 has a slight crown. The chamfered portions 424 provide a smooth transition between the top 425 and the wear strips 422 and 423.

Figure 8:
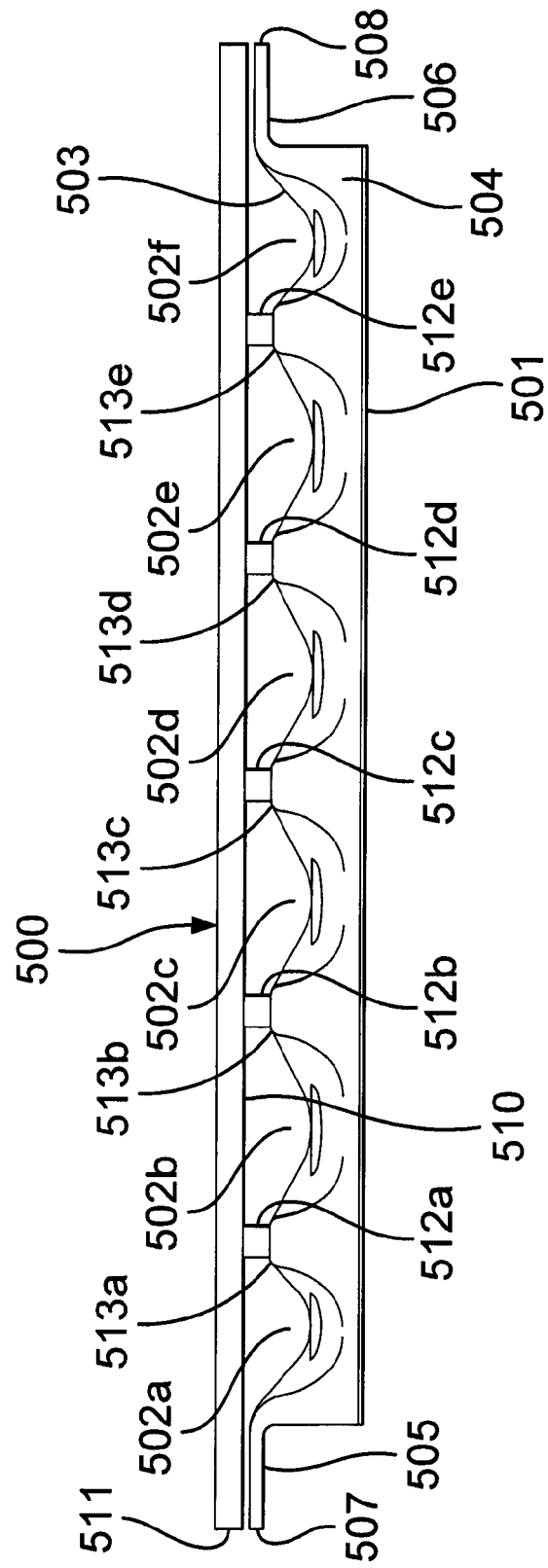
FIG. 8 is a schematic end view of a screen assembly seated on a flow tray in accordance with the present invention.

FIG. 8 shows a screen assembly 500 and a flow tray 501. The flow tray 501 comprises six recessed zones 502a, 502b 502c, 502d, 502e and 502f to facilitate flow of drilling fluid therealong, a far end 503, an open end 504 and a pair of sides 505 and 506. The sides 505 and 506 comprise flanged portions 507 and 508, which flanged portions 507 and 508 are slid into C-shaped channels and in basket and fixed therein, as before described. Preferably, the flanged portions 507 and 508 are glued or otherwise adhered to the C-shaped channels and may be riveted or mechanically fixed, but may be slidably removable from the channels and fixed with the screen assembly 500 by expandable pneumatic hose seal. The recessed zones 502a to 502f have an undulating profile which taper in depth from the far end 503 to the open end 504, which assumes a slope from the discharge end 31 to the feed end 14 of the shale shaker greater than the slope of the screen assembly 500. The slope of the screen assembly may be adjustable between ten degrees uphill and one degree downhill, but is preferably fixed at seven degrees uphill. The flow tray 501 also has an opening (not shown) therein. The gate valve 26 of the shale shaker 10 selectively prevents and allows screened drilling mud through the opening. The screen assembly comprises at least one layer of screening material 509 on a support structure 510. The support structure comprises a frame 511. The flow tray 501 is preferably formed in a mold with a composite material, such as KEVLAR™.

In use, the screen assembly 500 is inserted into the C-shaped channels 109 and 110 above the flow tray 501. Five support ribs 512a to 512e each having a wear strip thereon, are welded, glued or otherwise attached to flat topped crests 513a to 513e of the flow tray. A top surface of the support ribs 512a to 512e preferably lie in a plane which is between 1 and 3 millimeters above from the plane of the top of the flanges 507 and 508. The support structure 510 of the screen assembly 500 sits on five support ribs 512a to 512e. The screen assembly 500 is clamped in place by inflation of the inflatable pneumatic hose 111 in the C-shaped channels 109 and 110. Inflation of the pneumatic hose 111 pushes the sides of the screen assembly 500 on to the flanged portions 507 and 508 of the flow tray 501.

What is claimed is:

1. An apparatus for separating solids from solids laden drilling fluid, the apparatus comprising:
    a shale shaker and a screen assembly, the shale shaker comprising a basket and a vibratory mechanism for vibrating the basket, the basket having side supports and at least one longitudinal intermediate support arranged between said side supports, the screen assembly comprising a screen support supporting at least one layer of screening material, the screen support having a length with at least two side portions substantially parallel to the length of the screen support and at least one longitudinal support member substantially parallel to the length of the screen support between said side portions for engaging with said longitudinal intermediate supports and the at least two side portions supported by said side supports;
    wherein the at least one longitudinal support member is connected to a bottom surface of the screen support, the at least one longitudinal support member having a tapered surface and a further tapered surface at an opposing angle to said tapered surface along the length of the screen support, wherein the tapered surface and the further tapered surface are connected by a curved portion, and wherein a portion of the tapered surface and a portion of the further tapered surface extend beyond the bottom surface of the screen support; and
    wherein the at least one longitudinal intermediate support comprises a tapered support surface, a further tapered support surface at an opposing angle to said tapered support surface, and a strip comprising a crowned top therebetween, wherein the tapered surface and the further tapered surface correspond to the tapered support surface and the further tapered support surface of the at least one longitudinal intermediate support for surface to surface abutting engagement therewith along the length of the screen support, and wherein the curved portion is shaped to fit over the crowned top of the at least one longitudinal intermediate support.

2. The apparatus as claimed in claim 1, wherein said tapered surface and said further tapered surface of the at least one longitudinal support member diverges from the screen support.

3. The apparatus as claimed in claim 1, wherein said tapered support surface and said further tapered support surface of the at least one longitudinal intermediate support converges from said screen support.

4. The apparatus of claim 1, wherein the screen assembly further comprises:
    a perimeter with a plurality of support points within said perimeter;
    wherein at least one of said support points comprises a tapered surface and a further tapered surface at an opposing angle to said tapered surface.

5. The apparatus as claimed in claim 4, wherein said tapered surface and said further tapered surface diverge from said screen support.

6. The apparatus as claimed in claim 4, wherein the tapered surface lies in a plane which is between ten and eighty degrees from horizontal.

7. The apparatus as claimed in claim 4, wherein the tapered surface lies in a plane which is between forty and seventy degrees from horizontal.

8. A method of using the apparatus as claimed in claim 1, the method comprising:
    placing the screen assembly in the basket of the shale shaker, wherein the tapered surface and the further tapered surface at an opposing angle to the tapered surface abut the corresponding tapered support surface and the further tapered support surface at an opposing angle to the tapered support surface;

flowing the solids laden drilling fluid on to the screen assembly with at least a portion of the solids flowing over the screen assembly and at least a portion of said drilling fluid passing through said screen assembly.

9. The apparatus as claimed in claim 1, wherein the at least one intermediate support comprises at least one raised portion of a flow tray.

10. The apparatus as claimed in claim 9, wherein the basket further comprises a second screen deck, the flow tray directing the solids laden drilling fluid thereon.

11. The screen assembly as claimed in claim 4, wherein said tapered surface and said further tapered surface are formed from a sheet material.

12. A screen assembly for a shale shaker, the screen assembly comprising:
 a screen support supporting at least one layer of screening material, the screen support having a length with two sides substantially parallel to the length of the screen support; and
 a multiplicity of longitudinal structural support members connected to a bottom surface of the screen support between said two sides and disposed substantially parallel to the length of the screen support, wherein at least one of the longitudinal structural support members comprises a tapered surface and a further tapered surface at an opposing angle to said tapered surface along the length of the screen support, wherein the tapered surface and the further tapered surface are linked by a curved portion, wherein a portion of the tapered surface and a portion of the further tapered surface extend beyond the bottom surface of the screen support, wherein the tapered surface and the further tapered surface correspond to a tapered support surface and a further tapered support surface of at least one longitudinal intermediate support for surface to surface abutting engagement therewith along the length of the screen support, and wherein the curved portion is shaped to fit over a crowned top of the at least one longitudinal intermediate support.

13. The screen assembly as claimed in claim 12, wherein the screen support is a planar panel with openings therein.

14. The screen assembly as claimed in claim 12, wherein said further tapered surface diverges from said tapered surface.

15. The screen assembly as claimed in claim 12, wherein said further tapered surface is at an opposing angle to the tapered surface.

16. The screen assembly as claimed in claim 12, wherein the tapered surface lies in a plane which is between ten and eighty degrees from horizontal.

17. The screen assembly as claimed in claim 12, wherein the tapered surface lies in a plane which is between forty and seventy degrees from horizontal.

18. The screen assembly as claimed claim 12, wherein said tapered surface is formed from a sheet material.

19. The screen assembly as claimed claim 12, wherein said tapered surface has openings therein.

* * * * *